Feb. 11, 1930.  W. S. PRITCHARD  1,747,135
CORNER CONSTRUCTION FOR FRAMES AND METHOD OF MAKING THE SAME
Filed March 7, 1927  2 Sheets-Sheet 1
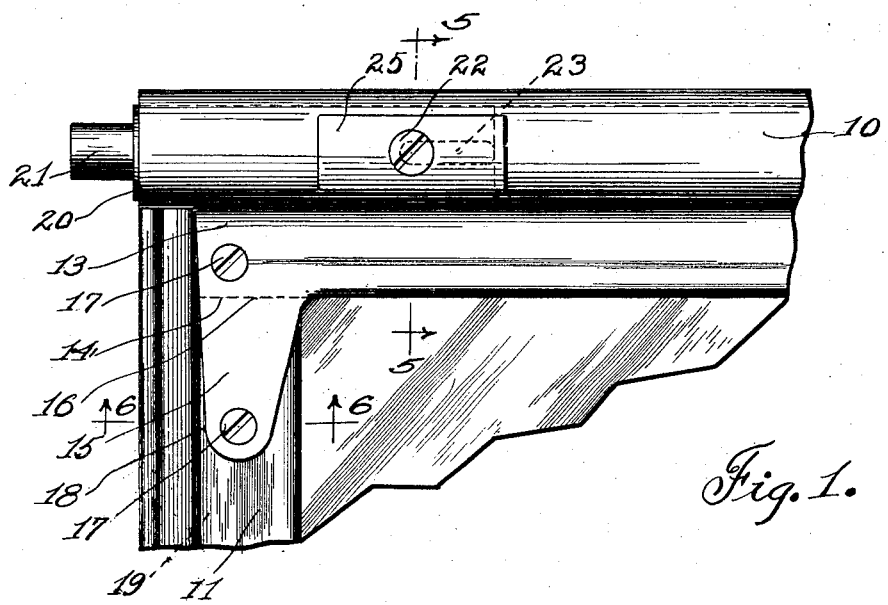
Fig. 1.
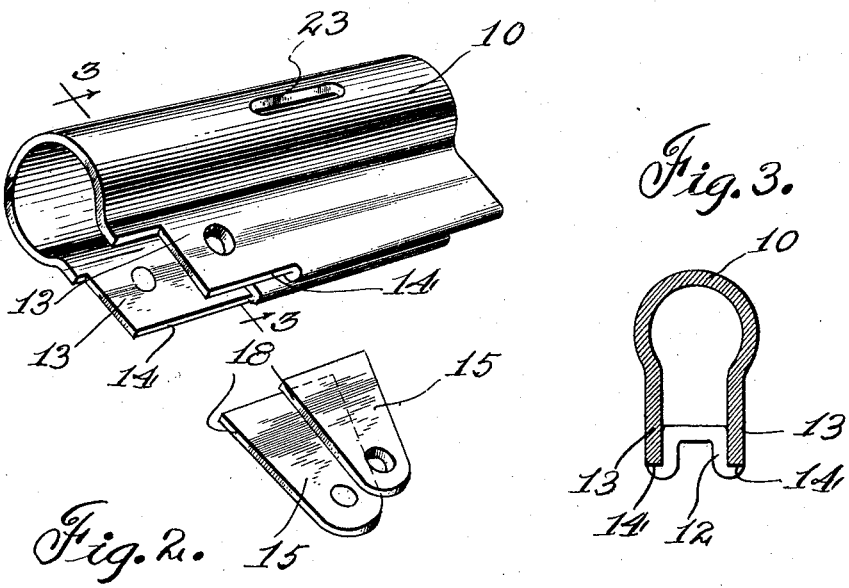
Fig. 2.
Fig. 3.
Inventor
William S. Pritchard
By Whittemore Hulbert
Whittemore & Belknap
Attorneys Feb. 11, 1930. W. S. PRITCHARD 1,747,135
CORNER CONSTRUCTION FOR FRAMES AND METHOD OF MAKING THE SAME
Filed March 7, 1927   2 Sheets-Sheet 2
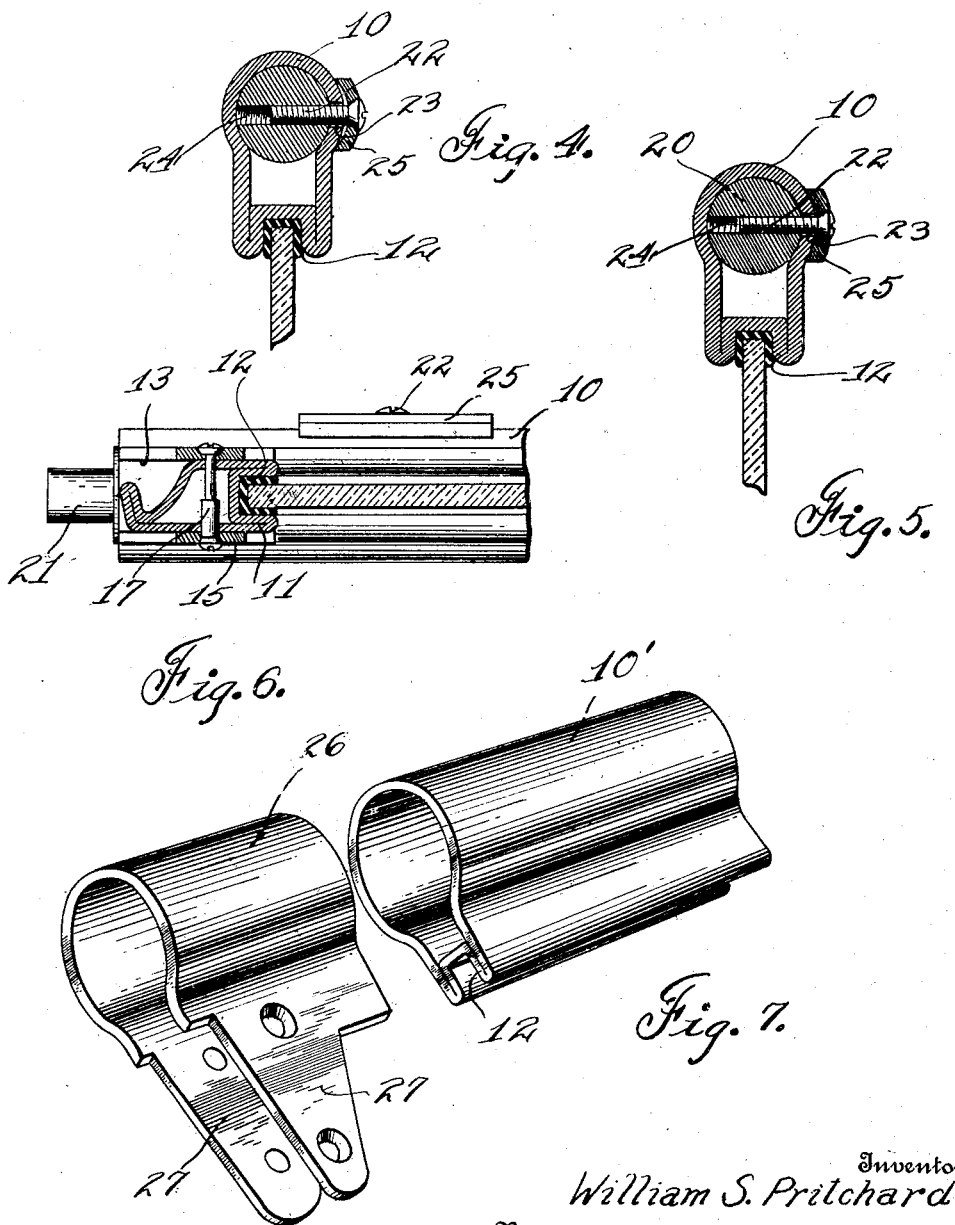

Patented Feb. 11, 1930

1,747,135

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

CORNER CONSTRUCTION FOR FRAMES AND METHOD OF MAKING THE SAME

Application filed March 7, 1927. Serial No. 173,508.

This invention relates to corner construction for frames and to the method of making the same and more particularly to improvements therein tending to simplify and cheapen the cost of manufacture.

While the invention is applicable to the corner construction of frames adapted for many different uses, nevertheless, the invention finds particular utility in connection with windshield frames. Heretofore it has been quite generally the practice to provide angular corner brackets for uniting the corners of, for instance, windshield frames, which brackets were in some instances, located within the tubular or channel shaped frame members and in other instances secured to the outer face or faces of these members. In the latter event the corner construction presented an unsightly appearance and in practically every instance the manner of connecting the corners of the frame members proved to be costly and otherwise inefficient commercially.

It is therefore, the primary object of this invention to provide a corner construction and a method of forming a corner construction which will be simple, durable and economical and which will furthermore present a sightly and finished appearance.

The several details of construction of this invention as well as the several steps of the method involved will be made more apparent as this description proceeds, especially when considered in connection with the accompanying drawings, wherein:

Figure 1 is a fragmentary view of the corner of the windshield frame constructed in accordance with this invention.

Figure 2 is a separated detail perspective view of one end of one of the frame members.

Figure 3 is a detail sectional view taken substantially on the plane indicated by line 3—3 in Figure 2.

Figures 4 and 5 are sectional views taken substantially on the plane indicated by line 5—5 in Figure 1 with the parts in different positions.

Figure 6 is a sectional view taken substantially on the plane indicated by line 6—6 in Figure 1, and Figure 7 is a separated detail perspective view of a modified form of construction.

Referring now particularly to the drawings and more especially to Figures 1 to 6 inclusive thereof, it will be noted that I have fragmentarily illustrated the adjacent ends of two frame members 10 and 11 which are usually formed of sheet metal and each provided with a glass channel 12. In carrying out my invention I propose removing a portion of the glass channel 12 from the ends of the frame member 10 so as to leave the spaced parallel walls 13 with free ends or edges 14 and consequently leave the end of the frame 10 U-shaped in cross section. To the free edges 14 of the walls 13 I propose connecting, for instance, by means of butt-welding, a pair of ears or lugs 15. By butt-welding these lugs to the frame member and by subsequently facing the joint a smooth unbroken surface is provided such as illustrated in elevation in Figure 1 wherein the line of weld is indicated by the dotted line 16. The lugs 15 are connected to the frame member 10 at a substantially right angle thereto and extend to the plane of the sides 13.

The other frame member 11 is then inserted between the spaced lugs 15 and up between the spaced walls 13 whereupon the two frame members are connected by means of fastening elements 17 which extend through aligned apertures in the lugs and walls 15 and 13 on the one hand and the frame member 11 on the other. By inclining one edge 18 of the lugs 15 as illustrated more particularly in Figure 1, the side frame member 11 may be connected to the frame member 10 at an angle as indicated by dotted lines at 19 to make provision for windshield frames having inclined side frame members.

In windshields particularly and in the case of many other types of frames in which this invention may find utility, it is sometimes essential and frequently desirable to have retractable supporting pivots and in this connection I propose providing pivot pin elements 20 provided with pivot pins 21 which elements telescope within for instance, the frame member 10 so that they may be moved within the frame member when the frame is being positioned between a pair of supporting uprights whereupon the elements may be moved to project the pivot pins 21 outwardly into pivot pin recesses in the supports or into other supporting means. For adjustably securing the elements 20 I provide a threaded member 22 which passes through a slot 23 in the frame member 10 and into a threaded aperture 24 in the element 20. The threaded member also passes through a clamping plate 25 formed of spring metal and bowed so as to normally assume the position illustrated in Figure 4. However, after element 20 has been adjusted the bolt 22 may be tightened to spring the clamping plate 25 into engagement with the frame member. The tension thus exerted by the clamping plate 25 prevents loosening of the bolt 22 and eliminates any rattling of the parts.

The modified form of the invention illustrated in Figure 7 differs from the previously described construction in that the frame member 10' is cut shorter and is adapted to have connected thereto an extension 26, the parts being preferably connected by butt-welding the adjacent edges. The extension 26 carries lugs 27 preferably formed integrally therewith between which the end of the other frame member (not shown) is adapted to extend and be secured as in the previously described construction.

While the details of the invention have been described herein somewhat in detail, it will be apparent to those skilled in this art that various changes may be resorted to without departing from the spirit and scope of the invention and to this end reservation is made to make such changes as may come within the purview of the accompanying claims.

What I claim as my invention is:—

1. In a corner construction for frames, a sheet metal frame member provided with a pair of spaced parallel sides terminating in a glass channel a portion of which has been removed adjacent one end to provide spaced walls having free edges, lugs butt-welded to said free edges and extending in the plane of said walls and at a right angle to said frame member and a second frame member extending between said lugs and secured in place by fastening means engaging the overlapping parts.

2. In the method of joining frame members having glass channels, those steps which consist in removing a portion of the glass channel from the end of one of the said frame members to form spaced longitudinal edges, securing lugs to said edges flush with the walls of said frame member, inserting the end of the other frame member between the lugs and securing the parts together.

3. The method of forming windshield frames which consists in forming a frame member of uniform cross-section throughout its length and having a glass channel, removing a portion of the glass channel from the frame member at one end thereof to provide a pair of spaced parallel walls, integrating lugs to said walls to provide extensions angular with respect to said frame members and disposed in the planes of said walls, inserting the end of another frame member between said extensions and uniting the parts by passing fastening elements therethrough.

4. In the method of forming frames from members of uniform cross-section comprising a substantially tubular member shaped to provide a glass channel having a pair of straight parallel walls, those steps which consist in removing a portion of the glass channel at one end of a frame member to leave the spaced parallel walls aforesaid, butt-welding lugs to said walls to extend at substantially a right angle to said frame member, inserting the end of the other frame member between said lugs and securing the parts by passing fastening elements through said lugs into said frame member.

5. In a corner construction for frames, a rolled sheet metal frame member of substantially uniform cross-section throughout its length, the cross section thereof providing spaced parallel sides having free edges, lugs butt-welded to said free edges and arranged substantially in the planes of said sides and at a substantial right-angle to said frame member, and a second frame member extending between said lugs and secured in place by fastening means engaging the overlapping parts.

In testimony whereof I affix my signature.

WILLIAM S. PRITCHARD.